United States Patent [19]

Fabricius et al.

[11] Patent Number: 5,397,690
[45] Date of Patent: Mar. 14, 1995

[54] NEAR-INFRARED ABSORBING DYES PREPARED FROM STENHOUSE SALTS

[75] Inventors: Dietrich M. Fabricius, Hendersonville, N.C.; Thomas Schelhorn, New Isenburg, Germany

[73] Assignee: E. I. Du Pont de Nemours and Company, Wilmington, Del.

[21] Appl. No.: 213,898

[22] Filed: Mar. 16, 1994

Related U.S. Application Data

[62] Division of Ser. No. 956,274, Oct. 5, 1992, abandoned.

[51] Int. Cl.$^6$ ................................................. G03C 1/06
[52] U.S. Cl. ...................................... 430/522; 430/510; 430/517
[58] Field of Search ........................ 430/522, 510, 517

[56] References Cited

U.S. PATENT DOCUMENTS

| | | |
|---|---|---|
| 3,793,313 | 2/1974 | Rillaers et al. |
| 4,839,265 | 6/1989 | Ohno et al. |
| 4,876,181 | 10/1989 | Proehl et al. |
| 5,017,707 | 5/1991 | Berneth et al. |
| 5,149,619 | 9/1992 | Mihara et al. |

FOREIGN PATENT DOCUMENTS

| | | |
|---|---|---|
| 0251282 | 6/1987 | Germany. |
| 441624 | 7/1934 | United Kingdom. |
| 0119831 | 3/1984 | United Kingdom. |
| 0362387 | 12/1988 | United Kingdom. |

*Primary Examiner*—Jack P. Brammer

[57] ABSTRACT

An improved dye class and preparation procedure therefore is provided. The dyes can be prepared from a Stenhouse salt which is economical and can be prepared from readily available reagents. The improved dye is particularly suited for use as an antihalation dye in photographic elements and does not impart deleterious properties thereto. These and other properties are provided in a dye represented by:

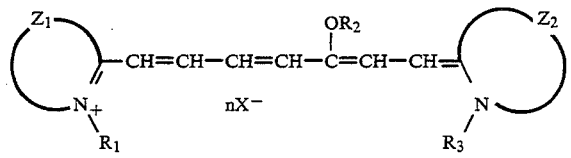

wherein the constituents have defined values.

4 Claims, No Drawings

NEAR-INFRARED ABSORBING DYES PREPARED FROM STENHOUSE SALTS

This is a division of application Ser. No. 07/956,274, filed Oct. 5, 1992, now abandoned.

FIELD OF INVENTION

This invention is related to a dye which absorbs in the red to infrared portion of the electromagnetic spectrum. More specifically this invention relates to a unique dye which can be prepared economically and easily. Even more specifically this dye relates to the use of this unique dye in an antihalation layer of a photographic element.

BACKGROUND OF THE INVENTION

It is well known in the art of photographic science to add dyes to the structure of a photographic element in such a way as to absorb deleterious light. The dye can be located in several positions including: between the exposure source and the photosensitive emulsion; between the photosensitive emulsion and the support; and on the opposite side of the support to inhibit halation. Specific applications are illustrated, for example, in *Research Disclosure*, No. 308, December 1989, Item 308119.

Antihalation is particularly important when a film is exposed with a laser such as in the use of long wavelength laser films for medical imaging. The high intensity of long wavelength light (i.e. red to infrared) emitted by the laser is difficult to filter completely. If high levels of a dye are used it is typically difficult to remove the dye during processing and the result is a coloration, or dye stain, which is undesirable.

Dyes which are useful as antihalation dyes are taught in U.S. Pat. No. 4,839,265. The dyes correspond to the formula:

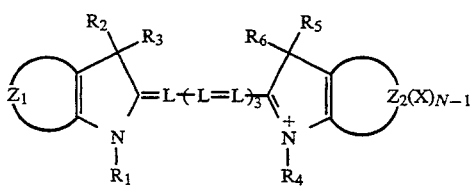

wherein; L represents a substituted or unsubstituted methine groups wherein the substitution includes substituted or unsubstituted lower alkyl groups containing from 1 to 5 carbon atoms, halogen atoms, substituted or unsubstituted aryl groups and lower alkoxy groups.

These dyes are manufactured either from relatively expensive ingredients, or from ingredients which are difficult to prepare. Typically, these dyes are manufactured as follows:

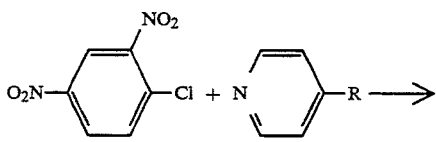

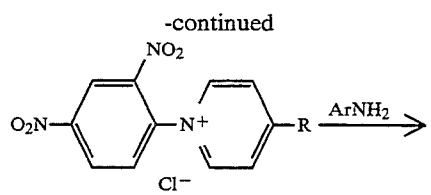

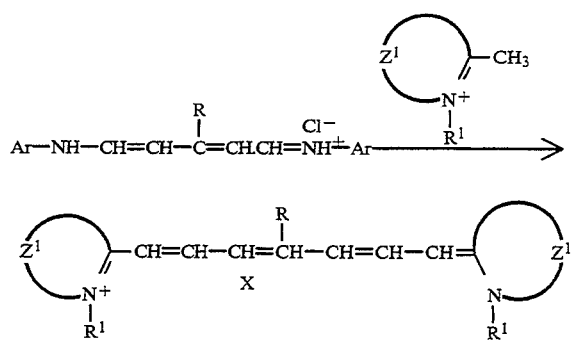

This process uses chlorodinitrobenzene and generates dinitroaniline, which both have deleterious effects on photographic elements. Furthermore, only symmetrically-substituted dyes can be prepared by this process.

U.S. Pat. No. 4,876,181 teaches the use of antihalation dyes which correspond to the following structure:

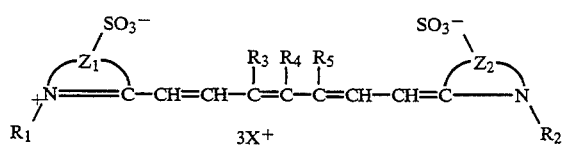

wherein $R_3$ and $R_5$ are each hydrogen or together represent the atoms necessary to complete a 5- or 6-membered carbocylic ring. These compounds are also prepared from expensive ingredients or from ingredients which are difficult to prepare. For example, dyes of U.S. Pat. No. 4,876,181 can be prepared as described in U.S. Pat. No. 4,839,265 or by a more elaborate process illustrated generally below:

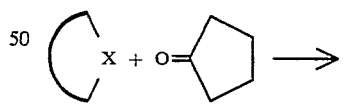

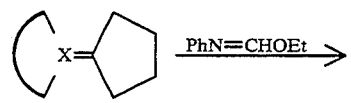

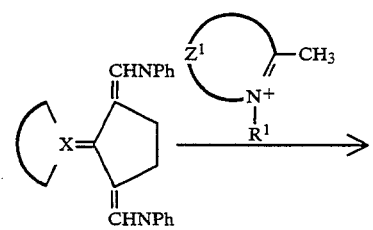

-continued

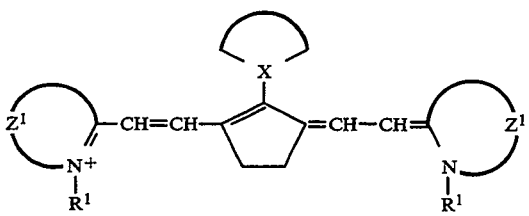

Dyes prepared by this process are considerably more expensive than dyes prepared by simpler processes. There has been a long felt need in the art for a dye which can be obtained from a simpler preparation procedure.

There has been a desire in the art to provide a dye which is easily prepared and which absorbs at long wavelengths (i.e. red to infrared) and which does not impart a color to the processed film.

SUMMARY OF THE INVENTION

It is an object of the present invention to provide a family of dyes which have a high molar absorptivity in the red and infrared region of the electromagnetic spectrum. It is a further object to provide a family of dyes which are useful in a photographic element to absorb radiation which would be deleterious to image quality. It is a further object to provide a family of dyes that can be manufactured at lower cost. It is a further object to provided a family of dyes that are easily modified prior to, or after manufacture to obtain desired physical properties. These advantages are provided in a dye, which is particularly suited for use in a photographic element, corresponding to the follow formula

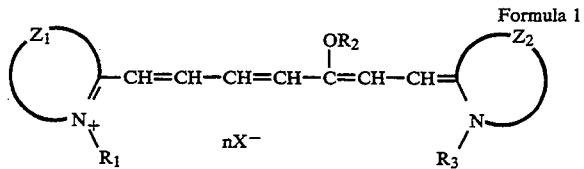

Formula 1 wherein $Z_1$ and $Z_2$ independently represent non-metallic atoms necessary to complete a heterocyclic nucleus of the type present in cyanide dyes;

$R_1$ and $R_3$ independently represent alkylsulfonate of 1 to 20 carbons or alkylcarboxylate of 1 to 20 carbons $R_2$ represents hydrogen, alkenyl of 2 to 20 carbons, aralkyl of 6 to 18 carbons, alkylsulfonate of 1 to 20 carbons, alkylcarboxylate of 1 to 20 carbons, an acyl of 2 to 20 carbons;

n is 0 to 3 as necessary to balance the change;

X represents a counterion chosen from the set consisting of halide, p-toluenesulfonate, methanesulfonate, trifluoromethanesulfonate, acetate, sodium, potassium, calcium, magnesium, lithium, ammonium, and trialkylammonium.

DETAILED DESCRIPTION OF THE INVENTION

The present invention comprises a class of dyes defined by Formula 1. These dyes are particularly useful when incorporated in an antihalation layer as described herein.

In Formula 1, the heterocyclic nuclei represented by $Z_1$ and $Z_2$ are the nonmetallic atoms necessary to complete a heterocyclic nucleus of the type present in cyanine dyes. Preferably, $Z_1$ and $Z_2$ independently represent the non-metallic atoms necessary to form a heterocyclic nuclei comprising 5 to 6 atoms in a heterocyclic ring. More preferably, the heterocyclic ring is composed of atoms selected from the group consisting of C, N, O, S and Se. Exemplary examples of heterocyclic nuclei of the types present in cyanine dyes include:

the thiazole series; e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole;

the benzothiazole series; e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4 -phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole;

the naphthothiazole series; e.g., naphtho[1,2]thiazole, naphtho[2,1]thiazole, 5-methoxynaphtho[2,1]-thiazole, 5-ethoxynaphtho[2,1]thiazole, 8-methoxynaphtho[1,2]thiazole, 7-methoxynaphtho[1,2]-thiazole;

the thianaphtheno-7',6',4,5-thiazole series; e.g. 4'-methoxythianaphtheno-7',6',4,5,thiazole;

the oxazole series; e.g., 4-methyloxazole, 5-methyloxazole, 4-phenyloxazole, 4,5-diphenyloxazole, 4-ethyloxazole, 4,5-dimethyloxazole, 5-phenylaxazole;

the benzoxazole series; e.g., 1-benzoxazole, 5-chlorobenzooxazole, 5-methylbenzoxazole, 5-phenylbenzoazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole;

the naphthoxazole series, e.g., naphtho[1,2]oxazole, naphtho[2,1oxazole];

the selenazole series; e.g., 4-methylselenazole, 4-phenylselenazole;

the benzoselenazole series; e.g., benzoselenazole, 5-chlorobenzoselenazole, 5-methylbenzoselenazole, 5-methoxybenzoselenazole, 5-hydroxybenzoselenazole, tetrahydrobenzoselenazole;

the naphthoselenazole series; e.g., naphthol[1,2-]selenazole, naphtho[2,1]selenazole;

the thiazoline series; e.g., thiazoline, 4-methylthiazoline;

the 2-quinoline series; e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline;

the 4-quinoline series; e.g., quinoline, 6-methoxyquinoline, 7-methoxyquinoline, 7-methylquinoline, 8-methylquinoline;

the 1-isoquinoline series; e.g., isoquinoline, 3, 4-dihydroisoquinoline;

the 3-isoquinoline series; e.g., isoquinoline;

the benzimidazole series; e.g., 1,3-diethylbenzimidazole, 1-ethyl-3-phenylbenzimidazole;

the 3,3-dialkylindolenine series; e.g., 3,3-dimethylindoline, 3,3,5-trimethylindolenine, 3,3,7-trimethylindolenine;

the 2-pyridine series; e.g., pyridine, 5-methylpyridine; and the 4-pyridine series; e.g. , pyridine;

the 3,3-dialkylbenz[e]indole series; e.g., 3,3-dimethylbenz[e]indole.

Preferably $Z_1$ and/or $Z_2$ complete a benzothiazole nucleus, a 3,3-dimethylbenz[e]indole nucleus or a 3,3-dialkylindolenine nucleus.

$R_1$ and $R_3$ independently represent alkylsulfonate of 1 to 20 carbons, alkylcarboxylate of 1 to 20 carbons. Preferably $R_1$ and $R_3$ independently represent alkylsulfonate of 2 to 4 carbons, alkylcarboxylate of 2 to 4 carbons.

$R_2$ represents hydrogen, an alkenyl of 2 to 20 carbons, aralkyl of 6 to 18 carbons, alkylsulfonate of 1 to 20 carbons, alkylcarboxylate of 1 to 20 carbons, acyl of 2 to 20 carbons. n is an integer of 0 to 3 as necessary to balance the charge on the molecule; X represents a counterion chosen from the set consisting of halide, p-toluenesulfonate, methanesulfonate, trifluoromethanesulfonate, acetate, sodium, potassium, calcium, magnesium, lithium, ammonium, and trialkylammonium.

It is understood that the terms alkylsulfonate, alkylcarboxylate, alkenyl, aralkyl and acyl refer to the substituted and unsubstituted groups, as known in the art.

Particularly preferred examples are include in Table 1 which is not intended to limit the current invention in any way.

TABLE I

EXEMPLARY DYES

| DYE | X | R | Z | $\lambda_{max}$ ($\epsilon \times 10^{-5}$) |
|-----|---|---|---|---|
| 1 | H | CH$_3$ | Cl— | 740 (1.18) |
| 2 | H | (CH$_2$)$_4$SO$_3^-$ | Et$_3$NH$^+$ | 750 (1.58) |
| 3 | SO$_3^-$ | CH$_3$ | Na+ | 750 (1.61) |
| 4 | CO$_2$H | (CH$_2$)$_4$SO$_3^-$ | Et$_3$NH$^+$ | 760 (2.38) |
| 5 | CH$_3$O | (CH$_2$)$_4$SO$_3^-$ | Et$_3$NH$^+$ | 777 (1.5) |
| 6 | H | CH$_3$ | Cl— | 780 (1.2) |
| 7 | H | (CH$_2$)$_4$SO$_3^-$ | Et$_3$NH+ | 785 (1.64) |
| 8 | SO$_3^-$ | (CH$_2$)$_4$SO$_3^-$ | 3 Et$_3$NH$^+$ | 789 (2.15) |

These dyes are prepared in a manner which provides for simple, inexpensive manufacturing process. The dyes are formed from Stenhouse salts of general formula:

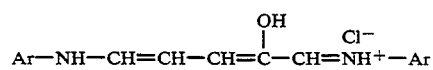

The reaction for the formation of the Stenhouse salts proceeds as follows:

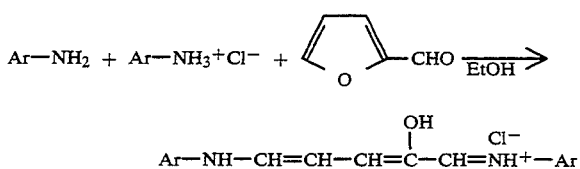

The dyes of the current invention are then prepared by the following reaction:

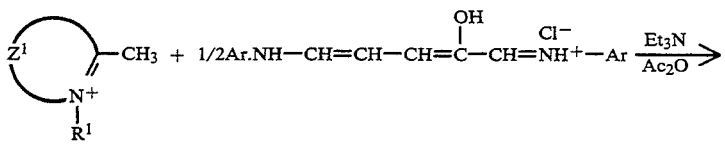

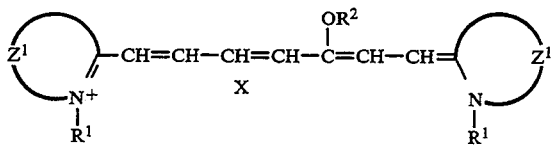

This process forms the acyl analogue preferentially as represented by Formula 1. The acyl analogue is advantageous, as illustrated herein, and is not available from the preparation procedures as taught in U.S. Pat. No. 4,876,181 or U.S. Pat. No. 4,839,265. The acyl may be modified to form the alkylsulfonate, alkylcarboxylate, alkenyl, aralkyl or alcohol as known in the art. It is understood that a compound wherein the two rings are different can be prepared in an analogous fashion by the stepwise reaction of the Stenhouse salt, as known in the art.

The antihalation layer comprises an absorbing amount of the antihalation dye represented by Formula 1 and can be present (1) on the opposite side of the support from a photosensitive layer; (2) between the photosensitive layer and the support; (3) supra to a photosensitive layer or (4) between photosensitive layers. Other conventional layers, such as, for example, subbing layers, antistatic layers, overcoats, etc., may be present. These conventional layers may be present either between the photosensitive layer and/or the antihalation layer and the support, between the photosensitive layer and the antihalation layer in the case in which both layers are present on the same side of the support, or on the side of the photosensitive layer and/or the antihalation layer away from the support.

The antihalation layer also comprises a vehicle. Such vehicles are well-known in the art and include hyrophilic colloids, such as, for example a gelatin, which may be derived from a variety of sources, such as, for example, cattle bone, pigskin, etc.; gelatin derivatives, such as, for example, phathalated gelatin, acetylated gelatin, etc.; polysaccharides, such as, for example, dextran, etc.; synthetic polymers, such as, for example, poly(vinyl alcohol) and water soluble partially hydrolyzed poly (vinyl acetate); acrylic polymers; polymers of alkyl and sulfoalkyl acrylates and methacrylates; polyamines; poly(vinyl acetals), such as, for example, poly (vinyl acetal), etc.; poly(vinyl ethers); etc. Gelatin is preferred.

To prepare the antihalation layer the dye can be dissolved in methanol, ethanol, water, or another suitable solvent, and added to an aqueous dispersion or melt of the vehicle. "An absorbing amount of the antihalation dye" means an amount of dye at least sufficient to impart antihalation properties to the layer yet not sufficient to cause any deleterious side effects. For antihalation layers an optical density of about 0.25 at the wavelength used for imaging is preferred. Using techniques well known to those skilled in the art, the concentration of dye required to attain this optical density can be calculated from the thickness of the antihalation layer and the absorption spectrum of the antihalation dye, which can be determined by conventional spectrophotometric techniques. The dyes are typically present in the antihalation layer in an amount of 0.005 to 0.05 g/M$^2$, preferably 0.01 to 0.03 g/M$^2$.

The photosensitive layers or layers of the photosensitive element comprises a component which is responsive to radiation. The photosensitive component is, preferably, a conventional gelatino silver halide emulsion or a hydrophilic colloid silver halide emulsion. Conventional photographic silver halide emulsions employing any of the commonly known halides, such as silver chloride, silver bromide, silver iodide, and mixtures thereof, may be used. These may be of varied content and may be negative and/or positive working.

The radiation sensitive layer also comprises a vehicle. Such vehicles are well-known in the art and include the materials useful as vehicles for the antihalation layer, described above. A preferred vehicle is gelatin.

The layer may be hardened by addition of a conventional hardening agent, such as, for example, formaldehyde, glyoxal. Conventional additives may also be present for specific purposes, such as, for example, to enhance and stabilize the response of the emulsion.

The preparation of silver halide emulsions is well known in the art. Silver halide emulsions, their preparation, and the preparation of photosensitive layers therefrom, are described in: Research Disclosure, Item 17643, December 1978; Research Disclosure, Item 18431, August 1979; Research Disclosure, Item 22534, January, 1983; and Abbot, U.S. Pat. No. 4,425,425, the disclosures of which are incorporated by reference.

The photosensitive component may be sensitized to near-infrared by techniques known in the art. Sensitization of silver halide may be accomplished with chemical sensitizers, such as, for example, gold compounds, iridium compounds, or with other group VIII metal compounds, or with spectral sensitizing dyes, such as for example, cyanine dyes, merocyanine dyes, styryls, etc.

The element may comprise any of a number of the other conventional additives and layers, such as are disclosed in any of the above incorporated references. These include, for example, optical brighteners, antifoggants, emulsion stabilizers, image stabilizers, filter dyes, intergrain absorbers, light-scattering materials, gelatin hardeners, coating aids, surfactants, overcoat layers, interlayer and barrier layers, antistat layers, plasticizers and lubricants, matting agents, development inhibitor-releasing compounds, etc. The element can be prepared by coating the layers onto the support using coating techniques which are conventional in the art.

The film support may be any suitable transparent plastic. For example, the cellulosic supports, e.g., cellulose acetate, cellulose triacetate, cellulose mixed esters, etc. may be used. Polymerized vinyl compounds, e.g., copolymerized vinyl acetate and vinyl chloride, polystyrene, and polymerized acrylates may also be mentioned. When polyethylene terephthalate is manufactured for use as a photographic support, it is preferable to use a mixed polymer subbing composition such as that taught by Rawlins, U.S. Pat. No. 3,567,452, Miller, U.S. Pat. Nos. 4,916,011 and 4,701,403, Cho, U.S. Pat. Nos. 4,891,308 and 4,585,730 and Schadt, U.S. Pat. No. 4,225,665. Upon completion of stretching and application of subbing composition, it is necessary to remove strain and tension in the base by a heat treatment comparable to the annealing of glass.

DYE PREPARATION PROCEDURES

The dyes are prepared utilizing standard organic synthetic techniques as known in the art and elaborated herein. Inventive dyes taught herein, but not specifically illustrated, can be prepared in an analogous fashion as known in the art. All parts and percentages are in parts by weight and degrees are in centigrade unless otherwise indicated.

Preparation of Dye Precursors

N-[5-(phenylamino)-2-hydroxy-2,5-pentadienylidene]aniline monohydrochloride

Aniline (36 ml, 0.395 mol) and aniline hydrochloride (51.24 g, 0.395 mol) were mixed with 600 ml of reagent alcohol at room temperature. Furaldehyde (32 ml, 0.395 mol) was added dropwise over a five-minute period. The solution immediately reddened and within ten minutes, the product precipitated. The mixture continued to be stirred until reaction was judged complete after seven hours. The product was collected by filtration, washed and slurried with isopropanol, then filtered again and dried to yield 105.62 g violet solid, mp 187° C., $\lambda_{max}=514$ ($\epsilon=39,400$).

1-(4-Sulfobutyl)-2,3,3-trimethylindolenium, inner salt 2,3,3-Trimethylindole (16.0 g, 0.01 mol) was heated with 10.4 ml melted 1,4-butanesultone and 20 ml o-xylene at 146° C. for 4 hours. The orange solution was cooled to 60° C. before adding acetone to dilute and induce crystallization. After cooling to room temperature, the product was collected by filtration, washed with acetone, and dried to yield 22.15 g of quaternary salt, mp 236° C.

Sodium 5-sulfo-2-methylene-1,3,3-trimethylindolenine

2-Methylene-1,3,3-trimethylindolenine (13.84 g, 0.08 mol) was added cautiously to mechanically stirred 30% fuming sulfuric acid at an initial temperature of 20° C. The reaction mixture exothermed to 84° C. during the 10-minute addition time. The mixture was heated to 100° C. for 60 minutes, then cooled to 10° C., and finally poured into 100 ml ice-water. Thirty ml of 50% sodium hydroxide was cautiously added. The mixture was allowed to sit overnight. The resulting product was collected by filtration, washed with acetone, and dried to give 14.60 g, mp 308° C. (dec). Acetone was added to the filtrate, causing forming of two liquid phases. The acetone phase was removed, stripped, and residue re-slurried in acetone. After filtration and drying, an additional 7.48 g of product was recovered.

5-Carboxy,2,3,3-trimethylindolenine

4-Hydrazinobenzoic acid (30.4 g, 0.2 mol), 3-methyl-2-butanone (30 ml, 0.2 mol), and 200 ml acetic acid were stirred together and heated to reflux for 7 hours, then stirred at room temperature overnight. The reaction mixture was filtered, then rotary evaporated to remove the acetic acid and the residue taken up with methanol. The methanol solution was poured into 300 ml ethyl acetate, stirred, and settled. The ethyl acetate portion was decanted, rotary evaporated, and the resulting solid recovered by filtration. Repeated concentration of the ethyl acetate portion, filtration, and ethyl acetate wash yielded 16.81 g, mp 207°–213° C.

5-Carboxy-1-(4-sulfobutyl)-2,3,3-trimethylindoleninium, inner salt

5-Carboxy-2,3,3-trimethylindolenine (12.18 g, 0.06 mol) was heated with 6.3 ml liquid 1,4-butanesultone and 60 ml o-xylene at 144° C. for 8 hours. The solution was cooled to 60° C. before adding acetone to dilute and induce crystallization. After cooling to room temperature, the product was collected by filtration, washed with acetone, and dried to yield 11.60 g of quaternary salt, mp 284°–288° C.

5-Methoxy-2,3,3-trimethylindolenine

4-Methoxyphenylhydrazine hydrochloride (32.17 g, 0.185 mol) and 3-methyl-2-butanone (30 ml, 0.28 mol) were mixed with 200 ml acetic acid and stirred at room temperature for 30 minutes. The mixture was refluxed for 6.5 hours, was cooled, filtered, and rotary evaporated. The residue was taken up in hot ethyl acetate, filtered to remove white crystals, and then rotary evaporated. The residue was vacuum distilled at 113° C. (0.16 Torr) to give 18.6 g of pale yellow liquid, which darkened upon prolonged storage.

5-Methoxy-1-(4-sulfobutyl)-2,3,3-trimethylindoleninium, inner salt

5-Methoxy-2,3,3-trimethylindolenine (18.6 g, 0.098 mol) was heated with 10.0 ml liquid 1,4-butanesultone and 40 ml o-xylene at 150° C. for 7 hours. The solution was cooled to 60° C. before adding acetone to dilute. After cooling to room temperature, the product was collected by filtration, washed with acetone, and dried to yield 27.35 g of pale blue quaternary salt, mp 242°–244° C.

1,2,3,3-Tetramethyl-1H-benzindolium p-toluenesulfonate 1,1,2-Trimethyl-1H-benzindole (31.35 g, 0.15 mol) was heated with 27.9 g liquid methyl p-toluenesulfonate and 120 ml o-xylene at 142° C. for 5.75 hours. The greenish solution was cooled to 98° C. before adding 100 ml acetone to dilute and induce crystallization. After cooling to room temperature, the product was collected by filtration, washed with acetone, and slurried in 175 ml acetone. After filtering and drying, the yield was 53.28 g of quaternary salt, mp 213° C.

2,3,3-Trimethyl-(4-sulfobutyl)-1H-benzindolium, inner salt 1,1,2-Trimethyl-1H-benzindole (184.47 g, 0.88 mol) was heated with 91.8 ml liquid 1,4-butanesultone and 600 ml o-xylene at 144°–148° C. for 7.5 hours. The greenish solution was cooled to 70° C. before adding 200 ml acetone to dilute and induce crystallization. After cooling to 13° C., the product was collected by filtration, washed with acetone, and slurried twice in acetone. After filtering and drying, the yield was 193.10 g of quaternary salt, mp 276° C.

Synthesis of Dye 1

N-[5-(phenylamino)-2-hydroxy-2,5-pentadienylidene]aniline monohydrochloride (3.00 g, 0.01 mol), Fischer's base (2-methylene-1,3,3-trimethylindolenine, 3.46 g, 0.02 mol), and 30 ml acetic anhydride were stirred together. Five drops of triethylamine were added and caused the immediate formation of dye. The reaction mixture was filtered, poured into 200 ml of ethyl acetate, filtered again, and rotary evaporated to concentrate. The concentrate was dissolved in isopropanol and poured into 400 ml ether. After stirring overnight, the ether was decanted and residue dissolved in a mixture of acetone, methanol, and ethyl acetate. The solution was rotary evaporated to dryness to give 2.69 g red-violet crystals of dye, mp 117°–145° C. In solution the spectral response was $\lambda_{max}=740$ nm ($\epsilon=118,000$). When the dye was incorporated in a photographic element, as taught herein, the spectral response was $\lambda_{max}$(film)=755 nm ($\epsilon=75,000$).

Synthesis of Dye 2

N-[5-(phenylamino)-2-hydroxy-2,5-pentadienylidene]aniline monohydrochloride (1.5 g, 0.005 mol), 2,3,3-trimethyl-(4-sulfobutyl)indolenium, inner salt (2.95 g, 0.01 mol) and 30 ml acetic anhydride were stirred together at 0° C. Triethylamine (1.01 g, 0.01 mol) was added and caused immediate formation of dye. The mixture was allowed to stir at room temperature for 2.3 hrs. The mixture was chilled in a methanol-ice bath, filtered, and poured into 300 ml of stirred ethyl acetate. The resulting solid was recovered by filtering and then washed by slurrying in ethyl acetate. After filtering and drying, the yield was 3.09 g, mp 135°–169° C., $\lambda_{max}$=750 ($\epsilon$=158,000). IR analysis shows a small band at 1757 cm$^{-1}$ (C=O) and a large band at 3500 cm$^{-1}$ (OH), indicating the dye is mixture of hydroxy and acetoxy forms of the dye.

Synthesis of Dye 3

N-[5-(phenylamino)-2-hydroxy-2,5-pentadienylidene]aniline monohydrochloride (1.5 g, 0.005 mol), sodium 5-sulfo-2methylene-1,3,3-trimethylindolenine (2.75 g, 0.01 mol) and 30 ml acetic anhydride were stirred together at ambient temperature. Triethylamine (1.01 g, 0.01 mol) was added, causing immediate formation of dye. The mixture was allowed to stir at room temperature for 2 hrs. The mixture was chilled in a methanol-ice bath, filtered, and poured into 300 ml of stirred ethyl acetate. The ethyl acetate was decanted and the resulting oily solid was slurried in fresh ethyl acetate overnight. Filtration and drying yielded 3.47 g, mp 180°–200° C., $\lambda_{max}$(methanol)=750 nm ($\epsilon$=158,000); $\lambda_{max}$(H$_2$O)=740 nm ($\epsilon$=154,000). Rewashing of this material with acetone yielded 3 10 g, mp 210°–215° C., $\lambda_{max}$(methanol)=750 nm ($\epsilon$=161,000), $\lambda_{max}$(film)=766 nm ($\epsilon$=108,000), Synthesis of Dye 4

N-[5-(phenylamino)-2-hydroxy-2,5-pentadienylidene]aniline monohydrochloride (0.75 g, 0.0025 mol), 5-Carboxy-1-(4-sulfobutyl)-2,3,3-trimethylindoleninium, inner salt (1.19 g, 0.005 mol) and 15 ml acetic anhydride were stirred together at ambient temperature. Triethylamine (2.01 g, 0.02 mol) was added and the mixture was heated to reflux. Acetic acid was added and reflux was continued for one hour. After stirring overnight at room temperature, the mixture was filtered and poured into stirred ethyl acetate. The ethyl acetate was decanted and the residue was slurried in fresh ethyl acetate. Filtration and drying yielded 0.41 g, mp 218°–227° C., $\lambda_{max}$(methanol)=760 nm ($\epsilon$=238,000), $\lambda_{max}$(film)=775 nm ($\epsilon$=213,000).

Synthesis of Dye 5

N-[5-(phenylamino)-2-hydroxy-2,5-pentadienylidene]aniline monohydrochloride (12.66 g, 0.042 mol), 5-methoxy-1-(4-sulfobutyl)-2,3,3-trimethylindoleninium, inner salt (27.50 g, 0.085 mol) and 250 ml acetic anhydride were stirred together at ambient temperature. Triethylamine (8.52 g, 0.084 mol) was added and the mixture was stirred 37 minutes at room temperature. The mixture was chilled to 0° C., filtered and poured into 1000 ml stirred ethyl acetate. The ethyl acetate was decanted and the resulting gum was dissolved in an isopropanol, methanol, and ethyl acetate mixture. The solution was rotary evaporated to dryness and the resulting solid stored under ethyl acetate overnight. The ethyl acetate was decanted and the residue dissolved in methanol. The dye was reprecipitated by pouring into ethyl acetate. The solvent was decanted and the residue triturated under ethyl acetate to yield solid dye. After reslurrying the dye twice with ethyl acetate, the dye was collected by filtration and vacuum dried to give 28 03 g, mp 170°–188° C., $\lambda_{max}$(methanol)=777 nm ($\epsilon$=155,000).

Synthesis of Dye 6

N-[5-(phenylamino)-2-hydroxy-2,5-pentadienylidene]aniline monohydrochloride (1.49 g, 0.005 mol), 1,2,3,3-Tetramethyl-1H-benzindolium p-toluenesulfonate (3.95 g, 0.01 mol) and 30 ml acetic anhydride were stirred together at ambient temperature. Triethylamine (1.01 g, 0.01 mol) was added and the mixture was stirred 50 minutes at room temperature. The mixture was filtered and poured into 200 ml stirred ethyl ether. The ether was decanted and the residue stirred with in isopropanol-ether mixture overnight. Filtering and drying yielded 2.54 g, mp 140°–165° C., $\lambda_{max}$(methanol)=780 nm ($\epsilon$=120,000) as the chloride salt, $\lambda_{max}$(film)=802 nm ($\epsilon$=107,000)

Synthesis of Dye 7

N-[5-(phenylamino)-2-hydroxy-2,5-pentadienylidene]aniline monohydrochloride (24.96 g, 0.083 mol), 2,3,3-Trimethyl-(4-sulfobutyl)-1H-benzindolium, inner salt, (57.27 g, 0.166 mol) and 400 ml acetic anhydride were stirred together at ambient temperature. Triethylamine (16.77 g, 0.166 mol) was added and the mixture was stirred 58 minutes at room temperature. The mixture was chilled 0° C., filtered and poured into 2000 ml stirred ethyl acetate. The ethyl acetate was decanted and the oily residue slurried in ethyl acetate. Repeated filtering and slurrying with ethyl acetate yielded, after vacuum drying, 67.60 g, mp 158°–188° C., $\lambda_{max}$(methanol)=788 nm ($\epsilon$=173,000).

Synthesis of Dye 8

N-[5-(Phenylamino)-2-hydroxy-2,5-pentadienylidene]aniline monohydrochloride (15.0 g, 0.05 mol), 7-sulfo-2,3,3-trimethyl-(4-sulfobutyl)-1H-benzindolium, inner salt [NKX-1632 from the Japanese Institute of Photosensitizing Dyes], (41.3 g, 0.1 mol) and 300 ml acetic anhydride were stirred together at ambient temperature. Triethylamine (20.2 g, 0.2 mol) was added and the mixture was stirred 80 minutes at ambient temperature. The mixture was filtered and poured into 2000 ml stirred ethyl acetate. The ethyl acetate was filtered away and the solid reslurried twice in ethyl acetate. After filtering and vacuum drying, the yield was 61.79 g of dye, mp 177°–195° C., $\lambda_{max}$(methanol)=789 nm ($\epsilon$=215,000).

Preparation of an Photographic Antihalation Backing

A 7% gelatin solution is made by cold soaking and then dissolving dry gelatin in water. This solution contains the ingredients as tabulated below:

| | |
|---|---|
| deionized water | 1900 g |
| dry gelatin | 200 g |
| polymethacrylate beads | 50 g |
| 3N sulfuric acid | 10 g |
| 28% aqueous Triton ® X-200 (trademark of Union Carbide Corp.) | 100 g |
| Lensodel ® HB7 (trademark of Shell Corp.) | 2 g |
| Fluorad ® FC-129 (trademark of 3M Corp.) | 8 g |
| 30% aqueous polyacrylate latex | 40 g |
| 5% aqueous Oxonol Red 536 Pina ® (trademark of Riedel de Haën A.G.) | 40 g |
| 37% Aqueous formaldehyde | 50 g |
| Aqueous or alcoholic dye solution up to | 250 g |

The above-prepared coating solution containing 7% gelatin in water was then applied to a 0.007 inch polyethylene terephthalate substrate suitably subbed as described in Alles U.S. Pat No. 2,779,684. Formaldehyde hardener was added into the gelatin solution. The coated layer was passed through a film dryer where cold air first sets the gelatin and then warm dry air removes the moisture and alcohol. The resulting antihalation layer contained 4.0 g gelatin/sq. meter. Dye A was used for comparison. The optical properties for Comparative Dye A, in the antihalation layer were $\lambda_{max}$(film)=724 nm ($\epsilon$=22,000).

Comparative Dye A

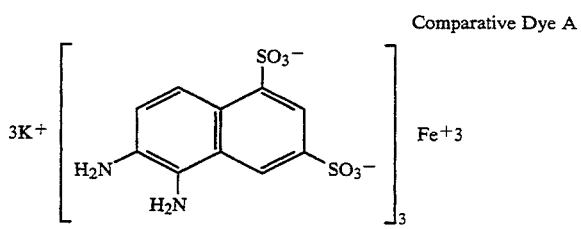

TABLE II
Spectral Properties of Dyes in Antihalation Coatings

| dye | dye level (mg/m²) | optical density @ $\lambda_{max}$ | optical density @ 780 nm |
|---|---|---|---|
| 1 | 26.7 | 0.440 | 0.300 |
| 1 | 40 | 0.600 | 0.400 |
| 3 | 15 | 0.250 | 0.215 |
| 3 | 26 | 0.460 | 0.385 |
| 3 | 34 | 0.525 | 0.435 |
| 4 | 10 | 0.210 | 0.205 |
| 4 | 15 | 0.275 | 0.270 |
| 5 | 14.3 | 0.250 | 0.235 |
| 5 | 28.6 | 0.415 | 0.390 |
| 5 | 57.1 | 0.760 | 0.720 |
| 6 | 15 | 0.180 | 0.140 |
| 6 | 26 | 0.315 | 0.235 |
| 6 | 34 | 0.38 | 0.305 |
| A | 56.3 | 0.130 | 0.090 |
| A | 93.8 | 0.200 | 0.140 |

The example clearly shows the dyes of this invention have superior and more efficient light-absorbing properties than the well-known comparative dye A. All dyes of this invention provide higher optical density at dye levels lower than comparative dye A. This provides economic benefit since desired antihalation optical densities can be obtained at much lower dye levels compared to comparative dye A.

What is claimed is:
1. A photographic element comprising:
   a support;
   a silver halide layer coated on said support;
   an antihalation layer coated on said support wherein said antihalation layer comprises 0.005 to 0.05 g/M² of an antihalation dye defined by;

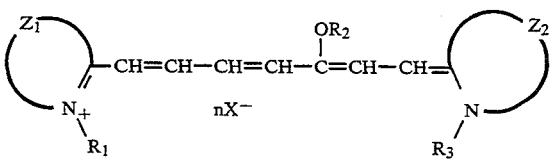

wherein
   $Z_1$ and $Z_2$ are independently chosen from 3,3-dimethylbenz(e)indole and 3,3-dialkylindolenine;
   $R_1$ and $R_3$ independently represent alkylsulfonate of 1 to 20 carbons or alkylcarboxylate of 1 to 20 carbons;
   $R_2$ represents hydrogen, alkenyl of 2 to 20 carbons, aralkyl of 6 to 18 carbons, alkylsulfonate of 1 to 20 carbons, alkylcarboxylate of 1 to 20 carbons, acyl of 2 to 20 carbons;
   n is 0 to 3 as necessary to balance the charge;
   X is a counterion chosen from the set consisting of halide, p-toluenesulfonate, methanesulfonate, trifluoromethanesulfonate, acetate, sodium, potassium, calcium, magnesium, lithium, ammonium, and trialkylammonium.

2. The photographic element recited in claim 1, wherein $R_2$ represents acyl of 2 to 20 carbons.

3. A photographic element comprising:
   a support;
   a silver halide layer coated on said support;
   an antihalation layer coated on said support wherein said antihalation layer comprises 0.005 to 0.05 g/M² of an antihalation dye chosen from the set consisting of:

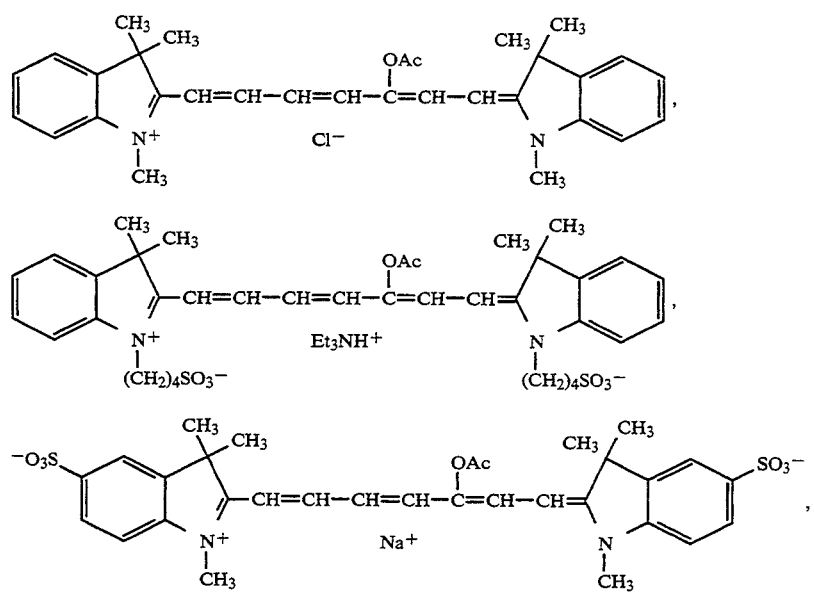

-continued
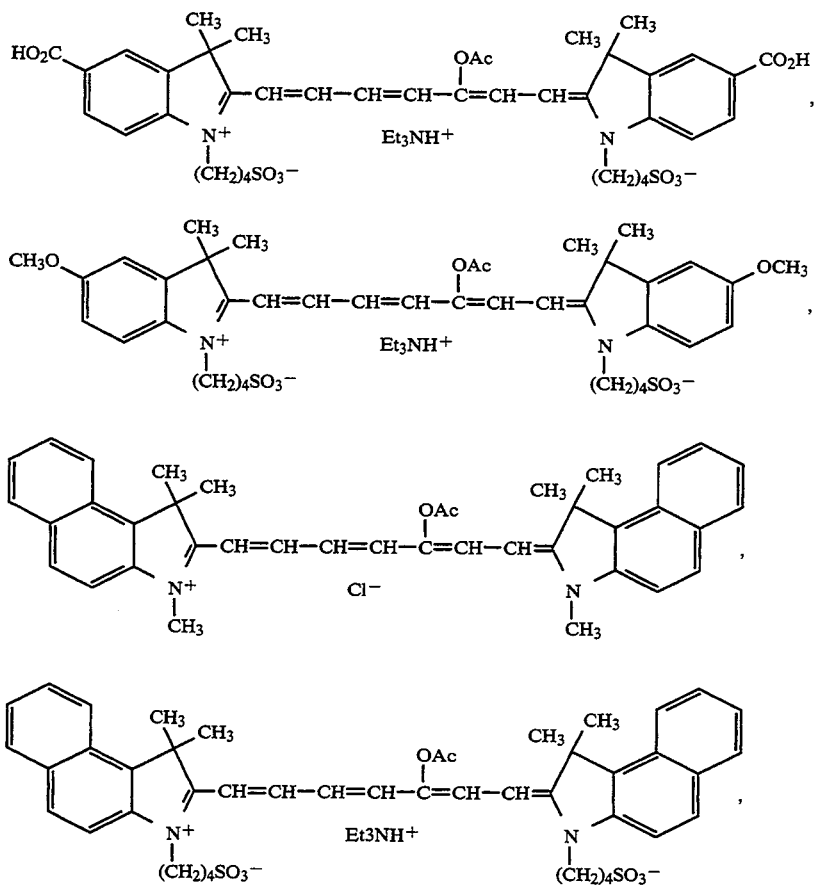
4. The photographic element recited in claim 3, chosen from the set consisting of:
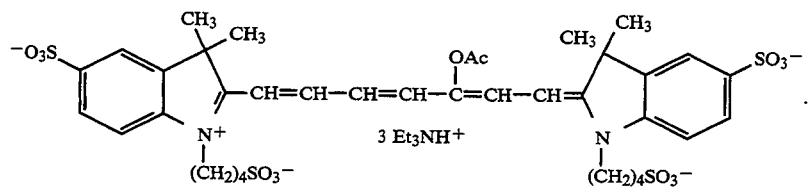
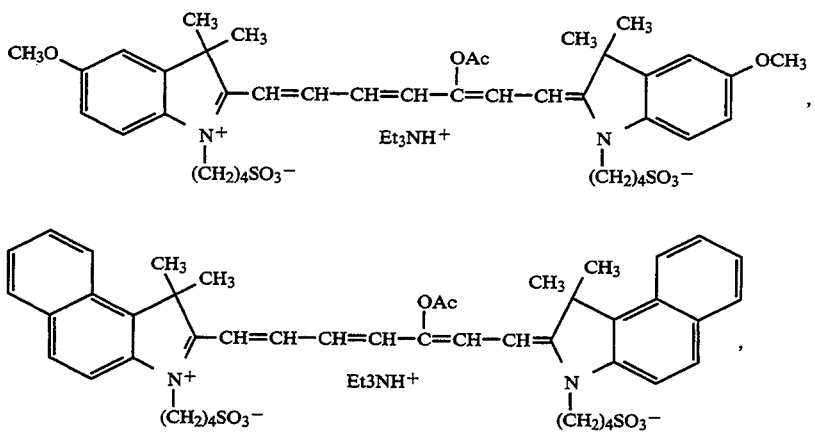

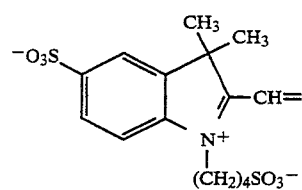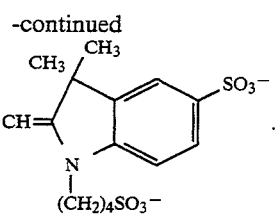
\* \* \* \* \*